United States Patent [19]

Minovitch

[11] Patent Number: 4,601,389

[45] Date of Patent: Jul. 22, 1986

[54] TUBULAR CONVEYOR SYSTEM AND OPERATING METHOD

[76] Inventor: Michael A. Minovitch, 2832 St. George St., Los Angeles, Calif. 90027

[21] Appl. No.: 652,146

[22] Filed: Sep. 17, 1984

Related U.S. Application Data

[63] Continuation of Ser. No. 354,754, Mar. 4, 1982, abandoned.

[51] Int. Cl.⁴ ............................................ B65G 17/00
[52] U.S. Cl. .................................... 198/804; 198/819
[58] Field of Search ............... 198/804, 805, 819, 321, 198/840

[56] References Cited

U.S. PATENT DOCUMENTS

| | | | |
|---|---|---|---|
| 3,620,357 | 11/1971 | Folkes | 198/805 |
| 4,077,510 | 3/1978 | Muller | 198/840 |
| 4,174,033 | 11/1979 | Parsons | 198/804 |
| 4,373,625 | 2/1983 | Parsons | 198/804 |

Primary Examiner—Jeffrey V. Nase
Attorney, Agent, or Firm—Christie, Parker & Hale

[57] ABSTRACT

An enclosed tubular continuous mechanical conveying system and method are provided for transporting bulk material or passengers at high speed along straight, curved or twisting paths with unlimited length in three-dimensional space. The conveying medium is a moving endless flexible toroidal surface that is elongated along the direction of motion. The inner surface of the toroid forms a moving enclosed duct that comprises the carrying portion of the surface while the outer portion forms another duct that moves in the opposite direction which encloses the inner duct and comprises the return run of the surface. A rigid, duct-like structure, is mounted inside the moving surface to maintain its shape. The surface is constructed with an elastic material to enable it to move around the rigid inner duct without tearing. The moving surface is mounted inside a rigid protective outer duct which completely encloses the conveyor. Driving means is provided for continuously moving the conveying surface around the inner duct structure. The carrying surface can be supported by a cushion of air trapped inside the toroidal surface or by a magnetic suspension system or by a slider-bed or roller-bed suspension system attached to the rigid inner duct.

14 Claims, 36 Drawing Figures

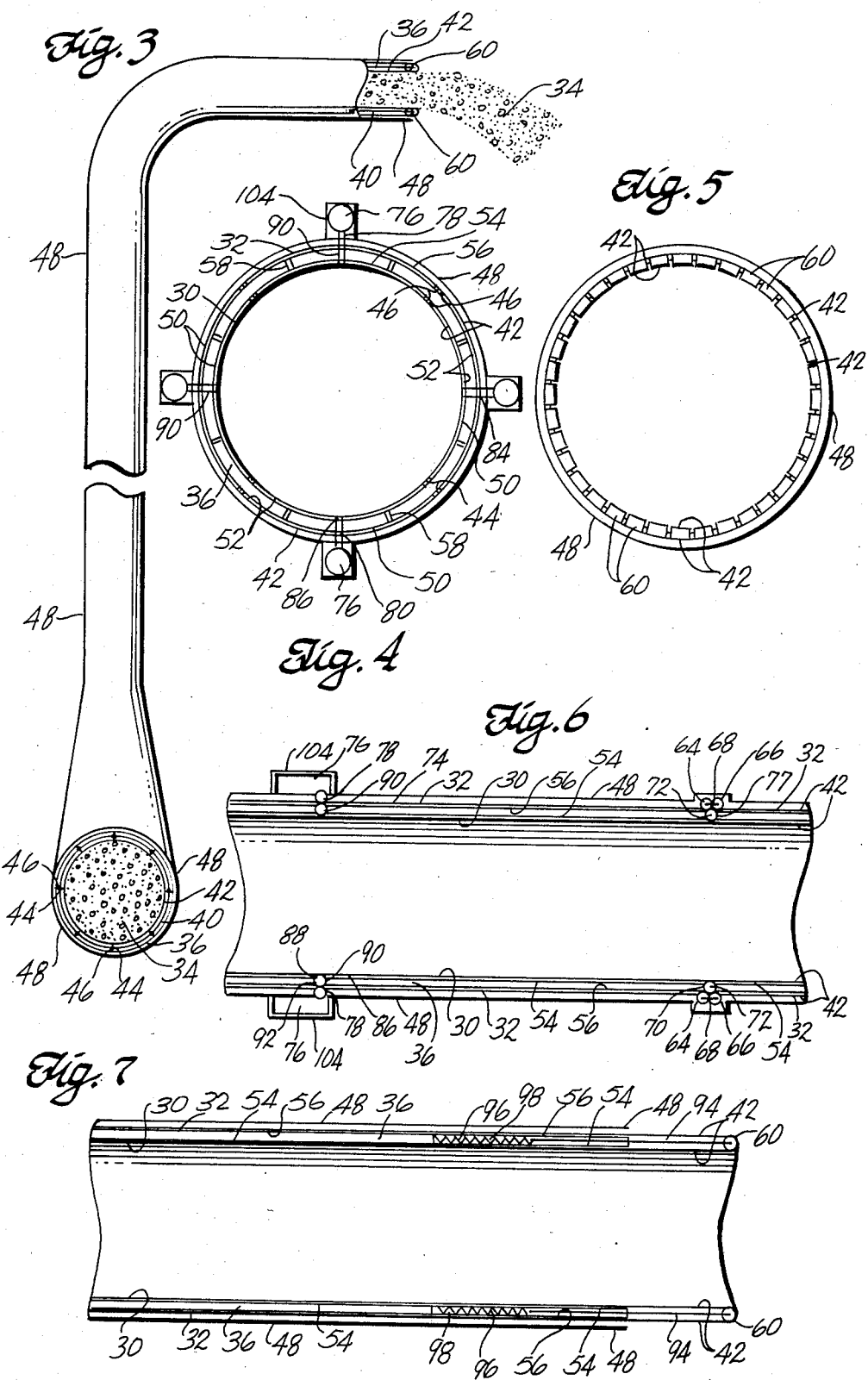

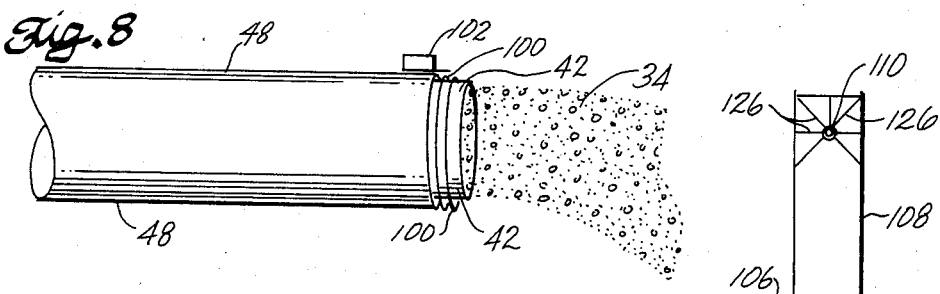
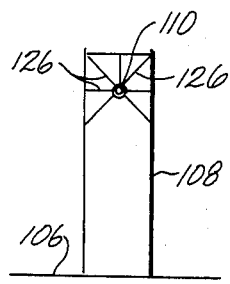
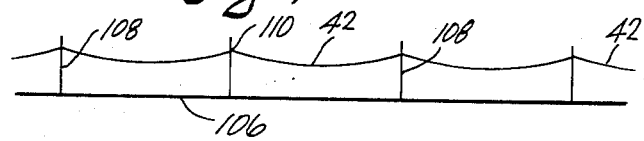
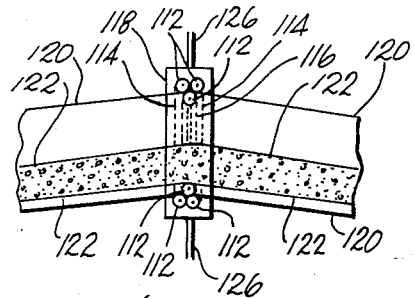
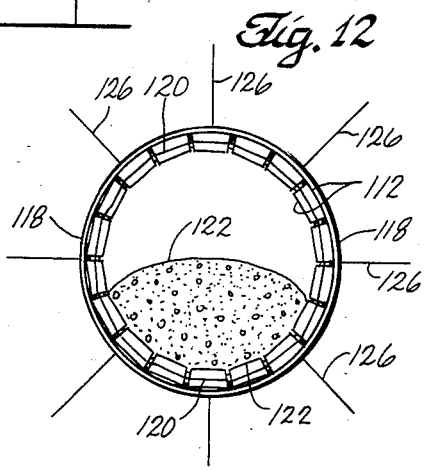
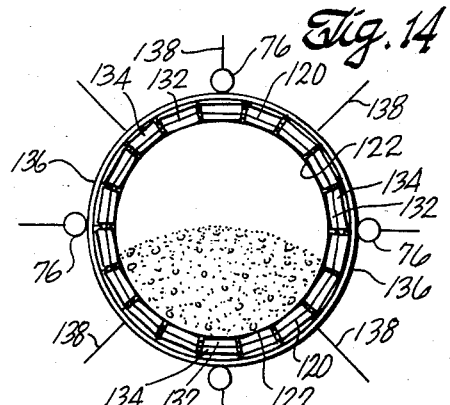
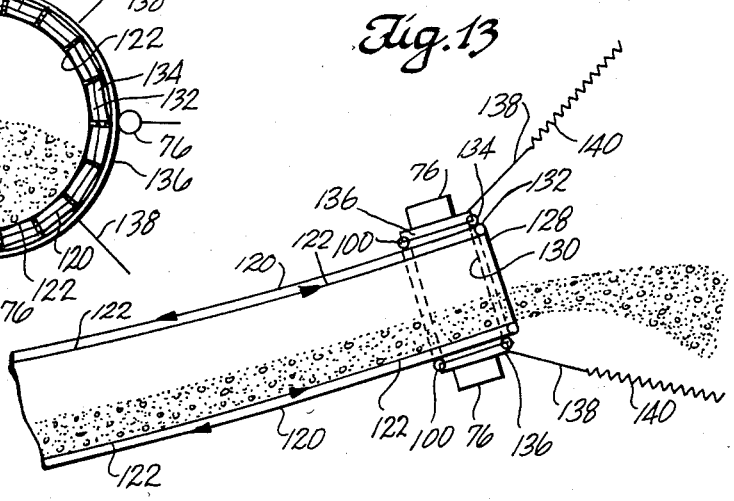

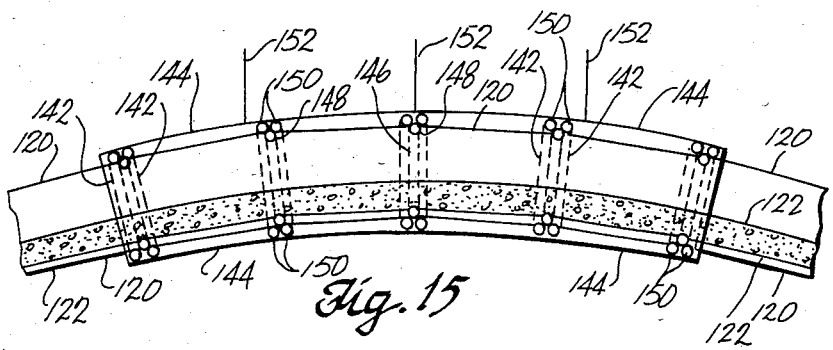
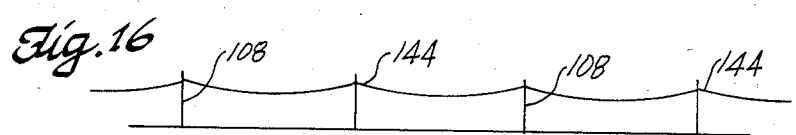
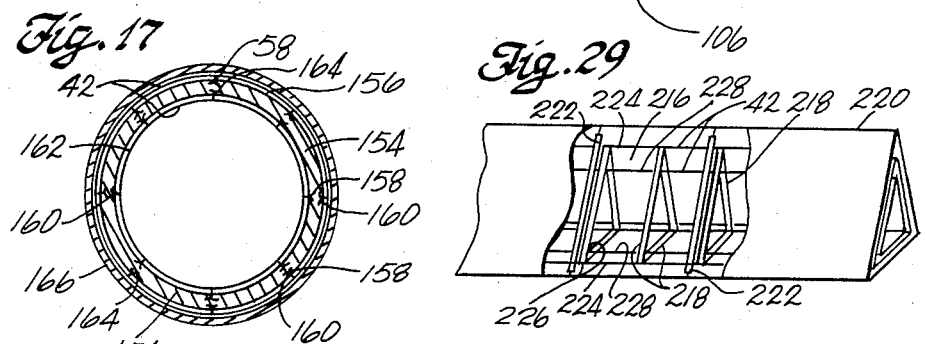
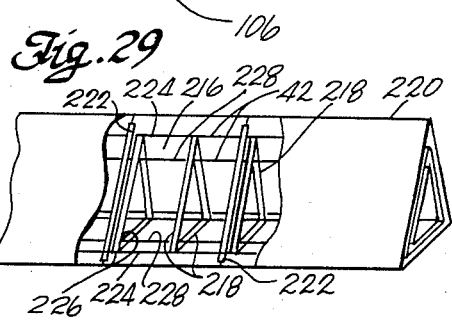
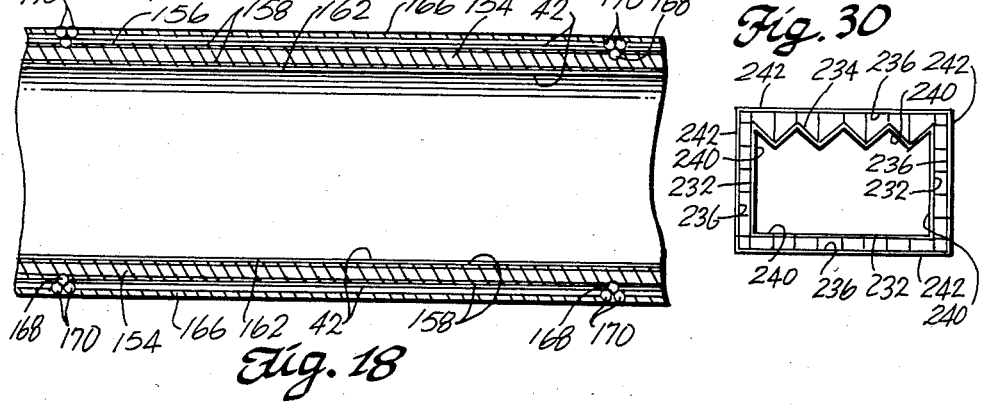
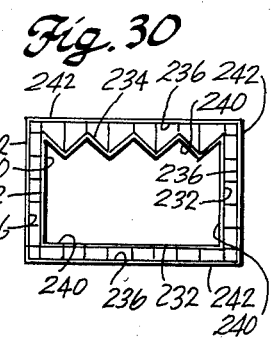
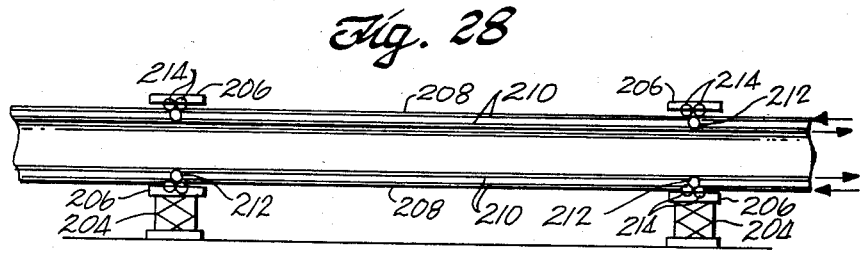

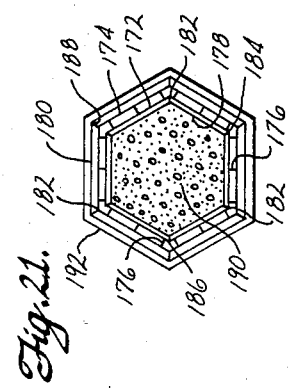
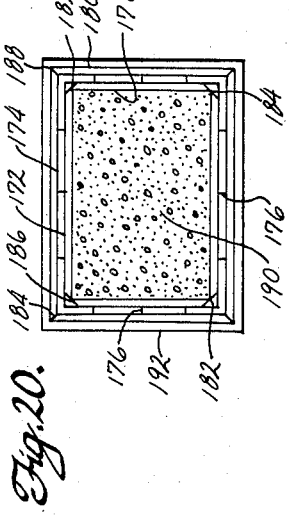
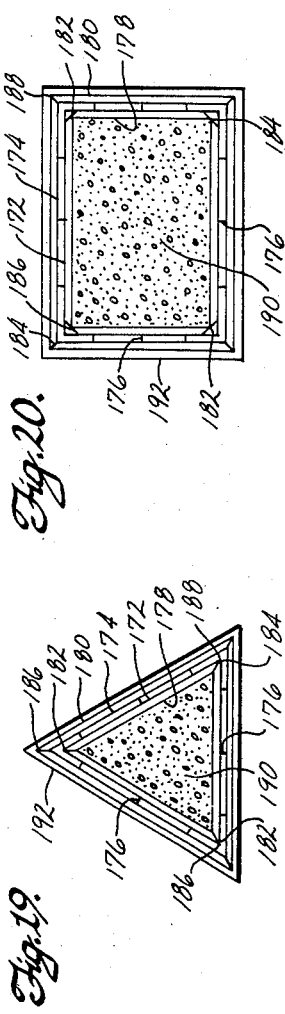

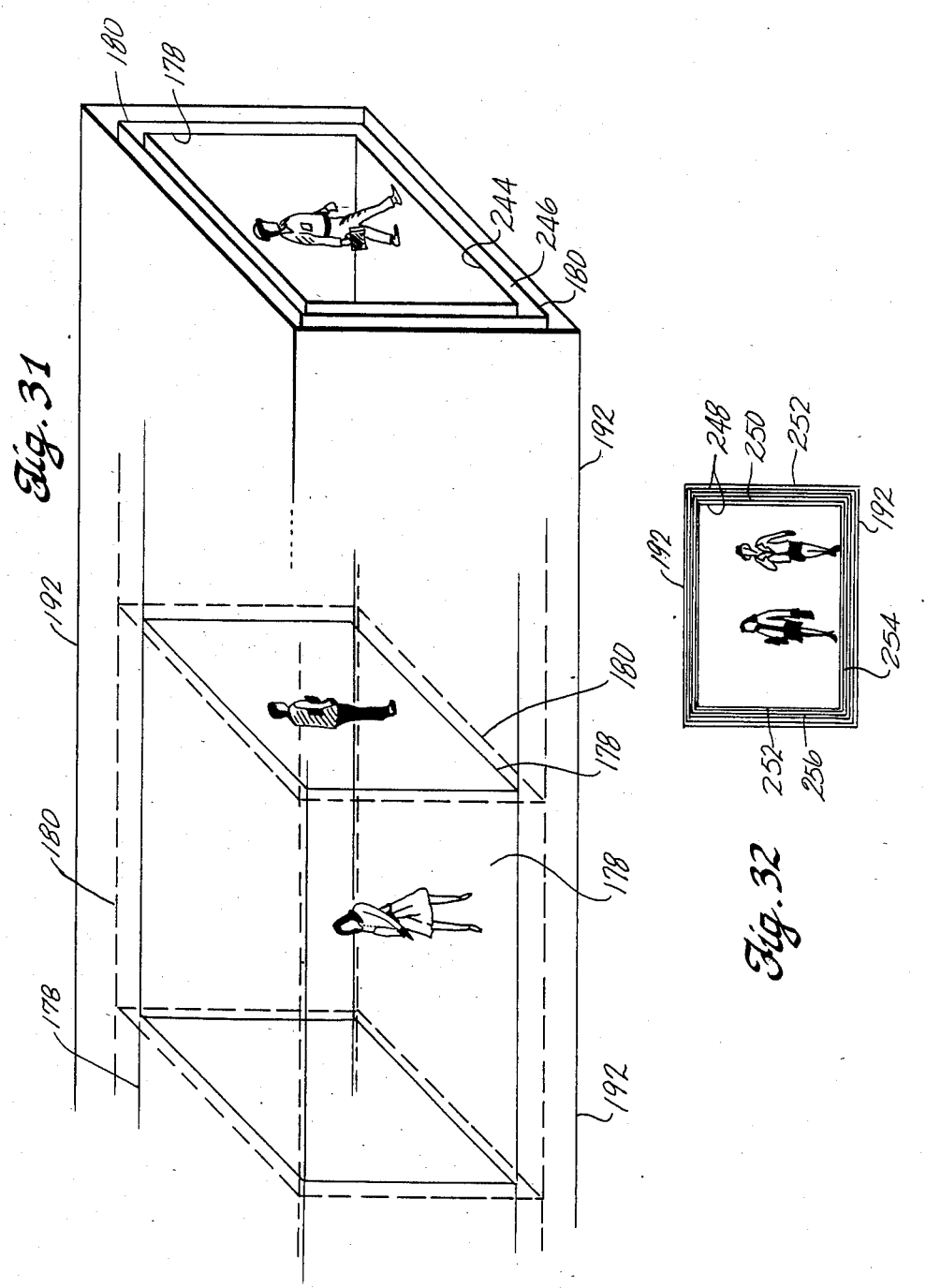

TUBULAR CONVEYOR SYSTEM AND OPERATING METHOD

This application is a continuation of U.S. patent application Ser. No. 354,754, filed Mar. 4, 1982 (now abandoned).

BACKGROUND

Prior art conveying systems for moving bulk materials have been developed, for the most part, to provide specialized tasks depending primarily upon the path which the material is to be conveyed. For example, when transporting material continuously along relatively straight horizontal paths with gentle inclines or declines, the traditional and well-known belt conveyor system is used. When material has to be transported along steep or vertical paths, well-known conveyors such as en-masse, screw, or bucket conveyors are used. Unfortunately, when the path requires both horizontal and vertical runs, the material often has to be transferred from one conveyor system to another conveyor system that is completely different. These transfer points are very inefficient and introduce many operational problems that would not otherwise exist if only one conveyor system could be used.

The idea of conveying solids or bulk material continuously through an enclosed tube or conduit is an extremely attractive possibility. If such a system could be developed that could twist and turn in any direction and climb vertically to any elevation with unlimited length, it could render almost all prior art conveyor systems completely obsolete. But such a system does not exist in the prior art and many conveyor design engineers believe that such a system is physically impossible.

Tube conveyor systems do exist in the prior art but their performance is severely limited. For example, continuous flow pneumatic conveyors are tubular conveyors but since they operate by setting up differences in air pressure, their energy efficiency is relatively low. These systems also have relatively short maximum conveying distances. Hydraulic or slurry conveyors represent another type of tubular conveyor system. The operating principle here involves pulverizing the material to be conveyed into small particles, mixing them with a convenient liquid (such as water) and pumping the mixture through a conveying tube as a fluid by a mechanical pump. Ordinary air can also be used as the carrying fluid instead of liquid. In this case the conveyor is called an air conveyor.

The above mentioned en-masse conveyor also represents a tubular conveyor system. In this system, a series of skeletal or solid flights connected to an endless chain or other linkage, is pulled through an enclosed duct or casing which drags the material through the duct in a substantially continuous flow.

The screw conveyor represents another tubular conveying system. In this system a rotating helically shaped shaft or screw extending along the longitudinal axis of the tube forces the material to move through the tube. Although these conveyors can elevate loads, no twisting or turning is possible.

Unfortunately, all of these prior art tubular conveyor systems are very inefficient because the material is forced to move through the tube like a fluid while the walls of the tube remain stationary. Thus, the frictional forces between the tube walls and the moving material is usually very high. This friction severely limits the useful operational lengths of these conveyors and their energy consumption is extremely high.

In view of the high frictional forces that result from moving solid or bulk materials through a stationary tube, it is obvious that the only way to remove this friction is to move the tube walls along with the load. But if the conveyor is required to move the material in a continuous flow operation, the conveying tube must be some type of endless surface. Thus, in designing such a conveyor, the basic question or problem is: How can material be loaded and unloaded continuously from a moving endless tube that completely encloses the material?

Heretofore, conveyor engineers of the prior art only recognized one solution to this basic problem. This solution involved continuously splitting open and then reclosing the moving tube at the loading point and at the unloading point where material is to be inserted and taken out of the tube. This solution is apparently viewed as being the only possible solution since it appears reasonable that the only way to pass material into and out of a continuously moving endless tube that completely encloses the material is through holes that are temporarily made through the tube walls.

In order to put this prior art solution into effect, the conveying medium was constructed in the form of an endless belt with zipper-like teeth mounted continuously along each edge of the belt which mesh together. When these edges are brought opposite each other in abutting relationship and zipped together, a moving tube is formed. Consequently, the operation of slitting open and reclosing the tube so that it can be continuously loaded and unloaded is accomplished by mechanical zipper-like devices that are mounted at the loading and unloading points. This conveyor system has become known in the art as the "closed belt" conveyor. One embodiment of this closed belt tubular conveyor system is disclosed by Hashimoto in his U.S. Pat. No. 3,338,383 entitled "Pipe Conveyor" filed Sept. 21, 1965. Numerous modifications have also been disclosed. The basic idea of the closed belt conveyor was first disclosed by Henry Johns in his U.S. Pat. No. 2,013,242 entitled "Conveying Mechanism" filed May 12, 1934.

Unfortunately, there is one major flaw with the closed belt conveying system that is inherent in its basic design. It can never be removed from the system because it involves an essential mechanical operation. In particular, this flaw involves the necessity of having to continuously open and reclose the belt edges, via the zipper-like mechanism. Both edges must be exactly aligned in abutting relationship before the belt can be properly closed. This is very difficult to achieve under actual operating conditions. (For example, the opposite edges of the belt are usually under different stress conditions due to the presence of various sized objects in the closed and loaded portions of the belt.) Consequently, the zipper mechanism frequently jams, resulting in a complete shutdown of the entire conveyor system. Furthermore, since the opening and closing mechanisms are exposed to the material being inserted and removed, they operate in dusty environments. This increases mechanical wear which inevitably leads to mechanical breakdown. Thus, in many situations, the closed belt conveyor system is nice in theory but not very useful in practice.

Although numerous improvements and modifications of the closed belt conveyor system have been disclosed over the past 45 years since its introduction, the basic operating principle has remained unchanged. Evidently, conveyor engineers view the closed belt as the only possible solution to the problem of finding a viable method for continuously loading and unloading a moving endless tube. However, I have discovered a radically new and fundamentally different solution to this problem that completely eliminates having to split open and reclose the moving tube. This solution does not require any zipper-like mechanism. It is continuous flow, smooth running, almost frictionless and almost impossible to jam. It can twist and turn in any direction and can climb vertically to any elevation and its length can be extended indefinitely. Yet, the conveyor is indeed a moving tube with endless walls.

BRIEF SUMMARY OF THE INVENTION

My solution to the moving tube conveying problem involves a fundamentally new type of endless conveying surface with a topology (i.e., geometrical shape) that is completely different from anything found in the prior art. In order to emphasize and illustrate this difference and to explain how this surface topology was discovered, it is useful to compare it with the carrying surface topology of the closed belt conveyor because the genus of both surfaces is the same—a closed torus. Although both solutions of the moving tube conveying problem can begin from the same toroidal surface, the final surfaces are completely different.

The fundamental problem of loading and unloading a continuously moving closed and endless conveyor tube is shown graphically in FIG. 1A. For simplicity, the tube 10 has a circular cross section and a circular overall shape like a torus (or doughnut). The tube lies in a fixed plane 12 with center C and with a major diameter lying along the line 14. At the ends of this line 14 are two points labeled A and B. The tube is now rotated continuously in the fixed plane 12 about a fixed rotation axis 16 that remains perpendicular to the plane 12. Referring to FIG. 1A, the tubular conveyor problem is to devise a method for inserting material into the moving tube 10 at point A and removing it at point B in a continuous fashion.

It is immediately obvious that since the tube 10 is endless and closed, the only way that material can be inserted into it and removed from inside it is to cut holes through the tube walls at points A and B. The problem, therefore, becomes the problem of finding a method for slitting open and reclosing the moving tube 10 at points A and B in a continuous manner while the tube is in continuous motion. As described above, the solution to this problem involves cutting the entire tube wall longitudinally along a path 18, as shown in FIG. 1B, and attaching each resulting edge with zipper-like teeth 20. Zipper mechanisms 22 are now added at points A and B to open and close the tube 10 in a continuous manner as the tube 10 moves past as shown in FIG. 1C. For simplicity, the carrying run 24 and return run 26 are straightened out to follow straight paths as shown in FIG. 1C which represents, schematically, the final configuration of this "closed belt" solution. All of the related supporting and driving mechanisms are deleted from FIGS. 1A–1C to emphasize the basic underlying topological aspects of the problem and this prior art solution.

Since the original torus 10 (FIG. 1A) has been slit all along the line 18 and opened at points A and B (FIG. 1B), it is no longer a closed toroidal surface. It is now an open surface. The underlying reasoning leading to this final topology for the carrying surface illustrated in FIGS. 1A–1C, is so compelling that it is not surprising that the closed belt solution is taken for granted as being the only possible solution to the moving tube conveyor problem.

I shall now describe how the original torus shown in FIG. 1A can be used to generate an entirely new carrying surface topology for the moving tube conveyor problem. I begin by taking the toroidal tube 10 of FIG. 1A and rotating it 90° about the center C such that the major axis 16 of the torus lies along the straight line 14 connecting the loading and unloading points A, B. Thus, in this orientation, the plane of the torus is now perpendicular to the line 14 connecting A and B. The next step is to stop rotating the torus about the major axis 16 and to start twisting it about its minor axis 28. In order to accomplish this fundamental change of motion, the torus must be constructed from some elastic material such as rubber. The results of these changes in orientation and motion are illustrated in FIG. 2A. All points on the inside and outside surface of the torus 10 now move in relatively small circles about the circular minor axis 28 (FIG. 2A) instead of rotating in large circles about the straight major axis 16 (FIG. 1A).

Assuming that the toroidal surface in FIG. 2A is made of an ideal elastic material that can be shrunk and stretched without tearing, the next step is to shrink the major diameter of the torus 10 and to then stretch the shrunken torus in opposite directions parallel to the major axis 16 (parallel to the line 14 connecting points A and B) such that the overall shape becomes two concentric cylinders with slightly different radii that are joined at each end by one-half of the original, but shrunken torus. FIG. 2B illustrates some intermediate configuration during this shrinking and stretching process. As shown in FIG. 2B, the inside cylindrical surface 30 moves continuously from A toward B parallel to the line 14 while the outside concentric cylindrical surface 32 moves continuously in the opposite direction from B back toward A parallel to the line 14.

FIG. 2C illustrates the final configuration of the moving surface after more shrinking and stretching. It represents my solution to the moving tube conveyor problem. Notice that the inner cylindrical surface 30 is a moving tube with endless walls that completely encloses the material 34 being moved. It forms the tubular carrying portion of my conveyor. The moving concentric outer cylinder 32 forms the return portion of my tubular conveyor. Since the entire surface was obtained from the original torus shown in FIG. 2A by simple shrinking and stretching without tearing or otherwise puncturing the surface, it is topologically equivalent to a torus. It has a closed inside region 36 and an outside region 38. The surface never has to be split open and reclosed as in the case of the closed belt conveyor. This fact, together with this toroidal topology, are fundamental features of my invention which distinguishes it from all other tubular or non-tubular conveyors in the prior art.

Many different embodiments of the present tubular conveyor system can be constructed using the basic moving toroidal conveying surface described above. For example, in one embodiment, the tubular shape of the moving flexible toroidal conveying surface is maintained by mounting a rigid guide tube 40 inside the inner region 36 of the moving surface 42. This rigid inner guide tube 40 can twist and turn in any direction along any path in three-dimensional space that is compatible with the miniture radius of curvature allowed by the loaded conveyor tube. It can climb to any elevation and can be extended indefinitely.

As illustrated schematically in the transverse cross-sectional and perspective, cut-away drawing in FIG. 3, the moving surface 42 follows the rigid inner guide tube 40 by a plurality of relatively small sliders 44 which are attached to and protrude a small distance from the inside portion of the moving surface 42. These sliders 44 ride snugly inside a plurality of relatively narrow parallel guide slots 46 that extend longitudinally around both sides of the inner guide tube 40. Notice that since the inside region 36 of the moving surface 42 is always separated from the outside environment, it can be permanently lubricated with lubricating oils that can never get contaminated. Thus, the toroidal surface 42 moves around the guide tube 40 in a smooth continuous motion that is nearly frictionless. Moreover, by trapping a small quantity of air inside this region, the load carried inside the tubular conveyor can be floated on a permanent cushion of air.

The entire conveyor tube is enclosed within a rigid protective outer tube cover 48 that is concentric with the moving conveyor surface 42 and with the rigid inner guide tube 40. The detailed mounting design of the rigid inner and outer tubular structures, as well as the driving mechanism which moves the surface 42 around the guide tube 40 are not shown in FIG. 3 in order to emphasize the basic topological features and operating principles of the conveyor. Many different structural designs of the invention are possible but only a few are disclosed herein with any detail. It is assumed that those skilled in the mechanical arts can design and construct many different variations and modifications that will operate satisfactorily.

It should be emphasized however, that in most of the embodiments the moving surface 42 should be constructed with a flexible material that is somewhat elastic. This will enable the moving surface 42 to move smoothly around the guide tube 40 without becoming overstressed and tearing. Notice that at each end of the guide tube 40, the moving surface reverses direction and expands or contracts to a new tubular surface with a greater or smaller radius. Sufficient elasticity is also required to enable the moving surface to flex around curves in three-dimensional space without tearing.

DRAWINGS

The fundamental operating principles and features of my tubular conveyor system will be apparent from the disclosure, which includes the specification with the foregoing and ongoing description, the claims and the accompanying drawings which are presented by way of illustrative example only wherein:

FIG. 3 illustrates a perspective, cut-away view of one embodiment of the tubular conveyor having a rigid inner guide tube mounted inside the moving toroidal conveying surface and a rigid outer tube cover;

FIG. 4 is an enlarged transverse cross-section of one embodiment of the tubular conveyor with a rigid inner guide tube and a rigid outer tube cover;

FIG. 5 is a transverse cross-section of the conveyor shown in FIG. 4 through one of its ends illustrating the circumferential end rollers;

FIG. 6 is a longitudinal cross-section of the tubular conveyor shown in FIG. 4 illustrating the moving toroidal conveying surface and the rigid inner guide tube and rigid outer tube cover;

FIG. 7 is a longitudinal cross-section of the tubular conveyor shown in FIG. 4 illustrating the take-up mechanism mounted at each end;

FIG. 8 is a perspective view of the discharge end of the tubular conveyor shown in FIG. 4 illustrating a rotating brush system for cleaning the moving surface;

FIG. 9 is a longitudinal view of a tubular self-supporting aerial conveyor;

FIG. 10 is a transverse view of a tubular self-supporting aerial conveyor;

FIG. 11 is a longitudinal cross-section of a tubular self-supporting aerial conveyor illustrating its suspension system;

FIG. 12 is an enlarged transverse cross-section of a tubular self-supporting aerial conveyor illustrating its suspension system;

FIG. 13 is a longitudinal cross-section of one end of an aerial tubular conveyor illustrating the supporting rings, supporting cables and take-up mechanism;

FIG. 14 is a transverse cross-section of one end of an aerial tubular conveyor illustrating the construction of the end rollers and the supporting rings;

FIG. 15 is a longitudinal cross-section of a tubular self-supporting aerial conveyor illustrating an arcing suspension system;

FIG. 16 is another longitudinal cross-sectional view of a tubular self-supporting aerial conveyor illustrating an arcing suspension system;

FIG. 17 is a transverse cross-section of a flexible hose tubular conveyor;

FIG. 18 is a longitudinal cross-section of a flexible hose tubular conveyor;

FIGS. 19, 20 and 21 are transverse cross-sections of rigid tubular conveyors with triangular, rectangular and hexagonal cross-sections respectively;

FIGS. 22, 23 and 24 are longitudinal cross-sections of rigid tubular conveyors with triangular, rectangular and hexagonal cross-sections respectively;

FIGS. 25, 26 and 27 are transverse cross-sections through one end of rigid tubular conveyors with triangular, rectangular and hexagonal cross-sections respectively illustrating the design of the circumferential end rollers;

FIG. 28 is a longitudinal cross-section of a tubular conveyor with a rigid inner guide tube but no external tube cover;

FIG. 29 is a cut-away perspective view of a rigid tubular conveyor supported by a roller-bed mounted along the inner guide tube;

FIG. 30 is a transverse cross-section of a rigid tubular conveyor with inner and outer guide tubes that have equal transverse perimeters;

FIG. 31 is a cut-away perspective view of a rigid high speed tubular conveyor with rectangular cross-section for transporting passengers; and FIG. 32 is a transverse cross-section of an ultra high speed tubular passenger conveyor with a non-contacting, magnetic suspension system.

DESCRIPTION OF THE PREFERRED EMBODIMENTS

Figure 1A:
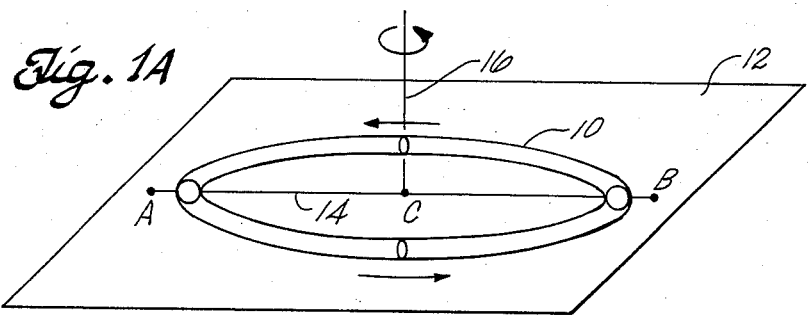
FIG. 1A illustrates the fundamental tubular conveyor problem where a closed tubular conveying surface is continuously moved around a circular endless path between a loading point and an unloading point.
Figure 1B:
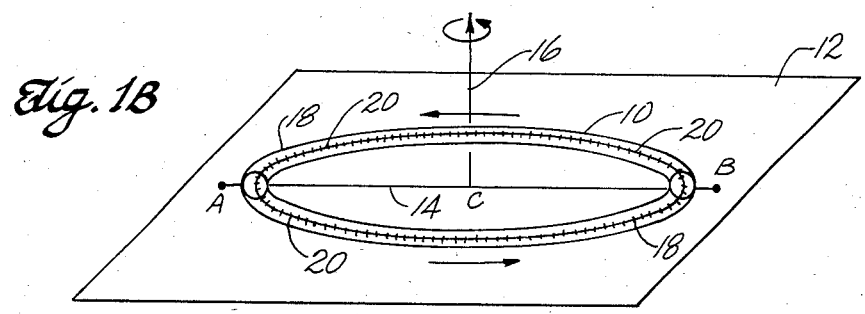
FIG. 1B illustrates the prior art solution of the tubular conveyor problem which involves cutting a continuous slit around the closed tubular conveying surface and attaching zipper-like teeth which mesh together on each edge.
Figure 1C:
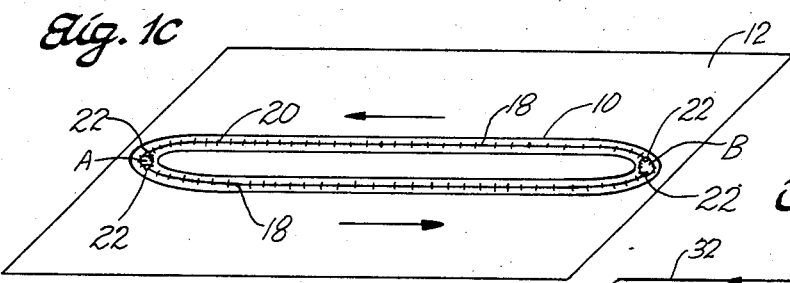
FIG. 1C illustrates the basic topological aspects of the prior art closed belt tubular conveyor system with mechanical zipper mechanisms for continuously opening and closing the moving tubular conveying surface at the loading and unloading points.
Figure 2B:
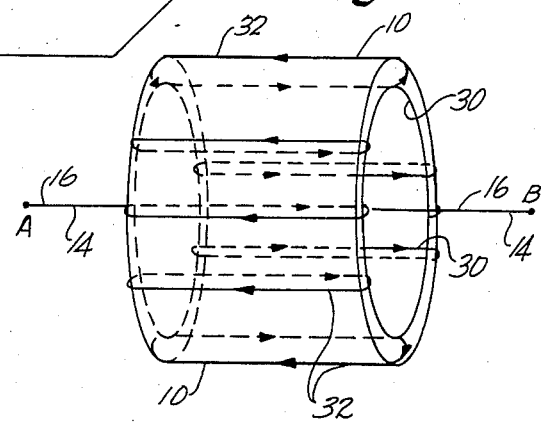
FIG. 2B illustrates the same moving toroidal surface of FIG. 2A at some intermediate point while it is shrunk toward and stretched along its major axis.
Figure 2A:
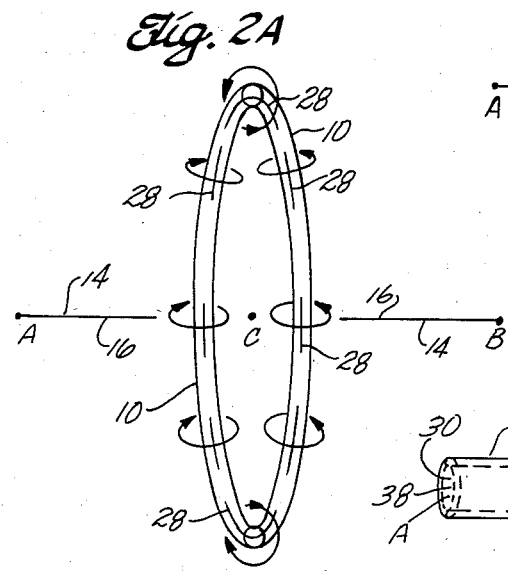
FIG. 2A illustrates how a new solution to the tubular conveyor problem can be obtained by rotating the toroidal surface shown in FIG. 1A 90° and twisting it around its minor axis instead of rotating it about its major axis.
Figure 2C:
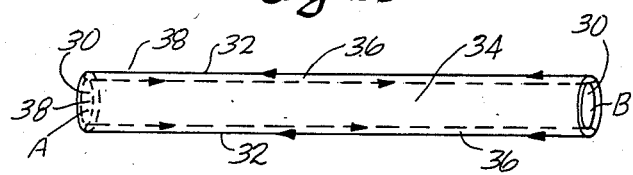
FIG. 2C illustrates the same moving toroidal surface of FIG. 2A after it has been shrunk toward and stretched along its major axis which represents a fundamentally new tubular conveying surface and a fundamentally new solution of the tubular conveyor problem on which the present invention is based.

The basic operating principle and method that underlies my continuous tubular conveyor and which distinguishes it from all other tubular or nontubular conveyors of the prior art is the unique design and operating principles of the moving conveying medium (i.e., the moving conveying surface). In particular, it is the unique elongated toroidal topology of this conveying surface, together with its movement, that forms the fundamental design and operating method that underlies the invention. Of course, there are many different types and sizes of elongated toroidal surfaces that can be used for the moving conveying surface of my tubular conveyor. This invention, however, is intended to embrace all such conveying surfaces that are "topologically equivalent" to a torus in the broadest mathematical interpretation of this equivalency. (Two surfaces are topologically equivalent if a perfectly elastic rubber duplicate of one surface can be transformed into the other surface by stretching or shrinking or otherwise deformed without being torn or punctured.) The specific structural features of the invention are considered secondary and are only designed to support the unique conveying surface and to keep it moving in a continuous manner. There are an unlimited number of possible embodiments for the construction of my tubular conveyor having various structural features and all of these embodiments are embraced by this invention. With the foregoing in mind, I shall now disclose a few of the many possible embodiments of my invention.

FIG. 4 is an enlarged transverse view of one embodiment of my continuous tubular conveyor illustrating how the moving toroidal surface 42 is guided around a rigid inner guide tube 40. The entire conveyor may twist and turn in any arbitrary direction and have horizontal, inclined and vertical runs of any length. The path of the conveyor is determined by the rigid guide tube 40 which is followed by the moving surface. In this embodiment, the inner guide tube 40 has a circular cross-section. The material 34 that is carried inside the conveyor tube is supported in part, by a permanent cushion of air 50 (or some other suitable gas) that is trapped inside the moving toroidal surface 42. This cushion of air significantly reduces friction and provides a soft carrying surface for the material 34 to ride on. This air cushion is similar in principle to that of a road vehicle supported by ordinary pneumatic tires that are also toroidal but not elongated. Thus, in this embodiment, the unique moving surface of my conveyor is not only a conveying surface but also a supporting surface as well. In addition, the entire inside face 52 of the moving toroidal surface is coated with a thin film of lubricating oil. Since this inside region is completely cut off and hermetically sealed from the outside environment, it can never bacome contaminated with dust or foreign particles. Thus, the inside surfaces of the moving conveyor will have almost zero contact friction with the surfaces of the inner guide tube 40 in the event they come into contact due to moving around curves or because of heavy loads.

The rigid guide tube 40 is constructed with two concentric tubes 54, 56 with slightly different radii that are held together in a spaced apart configuration by a plurality of spacers 58 mounted between the tubes 54, 56 that extend in parallel longitudinal rows over the length of the tubes. Each guide tube surface 54, 56 is fitted with a plurality of relatively narrow parallel guide slots 46 that extend longitudinally over the length of each tube. A plurality of relatively small sliders 44 are attached to and protrude a small distance from the inside face 52 of the moving toroidal surface 42. These sliders 44 ride snugly inside the guide slots 46 such that as the moving toroidal surface 42 moves around the guide tube 40 in the longitudinal direction, it closely follows and clings to the rigid external walls of the guide tube which may twist and turn along any curving path. There is no transverse rotation or any significant distortion of the moving surface 42 due to curves or due to the presence of the material 34 being carried on the carrying portion 30 of the moving surface 42.

FIG. 5 is a transverse cross-section of the tubular conveyor through one of its ends. It could represent either the loading end or the discharge end depending upon the direction of the moving toroidal surface. As shown in FIG. 5 a plurality of rollers 60 are mounted completely around each end circumference of the guide tubes 54, 56. They are closely spaced to follow the circular contour of each end. The diameters of these rollers are approximately equal to the maximum distance between the inner and outer guide tubes 54, 56. These end rollers 60 enable the moving surface 42 to move continuously and smoothly around each end of the guide tubes 54, 56 with very little friction.

The entire moving toroidal surface 42 and guide tube 40 is enclosed in a rigid outer tube cover 48 to protect the moving surface 42 and to give the tubular conveyor system added structural support and strength. This rigid outer tubular structure 48 is also concentric with the guide tube 40 and the moving surface 42.

FIG. 6 is a longitudinal cross-section of the tubular conveyor system illustrating the moving toroidal conveying surface 42, the rigid inner and outer guide tubes 54, 56 and the rigid outer protective tube cover 48. The outer tube cover 48 is held rigidly in place relative to the inner guide tube 40 by a plurality of passive rollers 62. As shown in FIG. 6, each group of co-acting passive rollers 62 is composed of two spaced apart outer rollers 64, 66 that are mounted on a support frame 68 connected to the outer tube cover 48, and one inner roller 70 that is mounted on another support frame 72 that is connected to the guide tubes 54, 56 and positioned between them. The outer (return) portion 32 of the moving surface 42 passes between the two outer rollers 64, 66 and the single inner roller 70. The inner roller 70 is mounted such that it is almost tangent to the two outer rollers 64, 66 with just enough space left for the moving return surface 32 to pass between. Consequently, the outer tube cover 48 is prevented from moving to the right relative to the inner guide tubes 54, 56 (FIG. 6) because of the contact between rollers 64 and 70, and is prevented from moving to the left because of the contact between rollers 66 and 70. The outer tube 48 is prevented from rotating about the inner guide tubes 54, 56 by a relatively small flange 74 that is bonded to each side of the moving surface 42 that passes between the rollers 64, 66 and 70. This flange 74 rides snugly inside corresponding grooves that are cut into the rollers 64, 66, 70.

A mechanical drive system is provided at various intervals along the tubular conveyor to provide the motive force for moving the toroidal surface 42 around the guide tube 40. One embodiment of this drive system is also illustrated in FIG. 4. As shown in this figure a plurality of relatively small driving motors 76 are symmetrically mounted around the outside circumferential periphery of the rigid outer tube cover 48. These motors (which may be electrical, pneumatic or hydraulic) turn driving gears 78 which move the outer portion 32 (i.e., return portion) of the moving toroidal conveyor surface. This is accomplished by mounting parallel tension bearing endless drive strips 80 (or drive belts) with notches or grooves 82 on the outside face of the moving toroidal surface 42. The driving gears 78 have teeth 84 that fit into these notches 82 such that when the driving motors 76 turn the driving gears 78, the driving belts 80 move the entire toroidal surface continuously around the inner guide tube 40. These driving belts 80 are mounted directly over some of the columns of slider elements 44 that ride inside the guide slots 46.

In order to transmit a portion of the motive power directly to the inner carrying run 30 of the moving toroidal surface, a second plurality of tension bearing parallel endless driving belts 86 are mounted along the inner face of the moving surface directly opposite the outside driving belts 80. These inner belts 86 are mounted in relatively narrow pairs that are separated by a row of slider elements 44. These inner driving belts 86 also have notches or grooves 88 similar to those on the outside belts 80. A plurality of relatively small power transmitting gears 90 are mounted inside the closed region 36 of the moving surface 42 between the inner and outer guide tubes 54, 56 and directly opposite the driving gears 78 with teeth 92 that fit into the notches 88 of the inner driving belts 86 such that when the driving gears 78 are turned by the motors 76, the power transmitting gears 90 are also turned. These gears 90 transmit direct motive power to the inside driving belts 86 which provide direct drive to the entire inside portion 30 of the moving surface (which is the carrying run of the conveyor).

This entire drive system using many individual driving motors provides smooth, silent and continuous motive power over the entire toroidal conveying surface which eliminates over stressing and surface distortions. (The motors and driving belts distribute the driving forces evenly over the entire moving surface.)

By adopting modular construction techniques for this tubular conveyor system, additional motors can be added along vertical runs while excess motors can be taken off along horizontal runs. Thus, the tubular conveyor system has the capability of lifting material up a vertical mine shaft, for example, of unlimited depth and conveying it unlimited distances on the surface along any path to a central location in a continuous unbroken stream without any transfer points whatsoever.

At the discharge end of the tubular conveyor, the moving toroidal surface 42 briefly emerges from the outer tube cover 48 from along the inside portion of the inner guide tube 54 (which is the carrying run 30 of the conveyor) reverses direction (thereby discharging material 34) and expands to a greater diameter by passing over the end rollers 60, and goes back through the tube 48 along the outside portion of the outer guide tube 56 (which is the return run 32 of the conveyor). Likewise, at the loading end of the tubular conveyor, the moving toroidal surface 42 briefly emerges from the outer tube cover 48 from along the outside portion of the outer guide tube 56 (the return run 32) reverses direction, contracts to a smaller diameter by passing over the end rollers 60, receives material 34 and goes back through the tube 48 adjacent the inside portion of the inner guide tube 54 (which is the carrying run 30 of the moving surface).

It should be emphasized that the ruturn run 32 of the conveyor forms a flexible moving tubular surface that completely encloses the carrying run 30 which is moving in the opposite direction. The carrying run forms another flexible moving tubular surface (inside and concentric to the moving tubular surface of the return run 32) that completely encloses the material 34 being conveyed. This unique operating principle of my tubular conveyor is made possible by the elongated toroidal topology of the endless moving conveying surface which lies at the heart of my invention.

FIG. 7 is a longitudinal cross-section of the tubular conveyor through one of its ends. It could represent either the loading end or the discharge end depending upon the direction of the moving toroidal surface. As shown in FIG. 7, the end rollers 60 are mounted around the end circumference of a tubular spring loaded take-up sleeve 94 that is mounted between the guide tubes 54, 56 and which extends out from these tubes a small distance. This take-up sleeve 94 is free to extend and retract small distances from the ends of the guide tubes 54, 56 and is designed to automatically give the moving conveyor surface 42 the proper longitudinal tension and to maintain this tension when the moving conveyor surface 42 is stretched or contracted due to various loading conditions. This is accomplished by mounting a plurality of springs 96 in a circular band-like housing 98 between the guide tubes 54, 56 immediately behind the end of the take-up sleeve 94. These springs 96 exert a constant outward force on the take-up sleeve 94 as the sleeve advances and retracts due to various longitudinal stretching in the moving conveyor surface.

FIG. 8 is a perspective view of the discharge end of the tubular conveyor illustrating a system for cleaning the external moving surface 42 by a plurality of rotating brushes 100. These brushes 100 are mounted around the entire circumferential periphery of the moving surface immediately after it passes over the end rollers but just before it re-enters the conveyor tube 48. These brushes 100 are rotated by some power source 102 mounted on the tube just behind the brushes 100.

As an alternative to rotating brushes, a cleaning system can also be designed by blowing jets of air over the moving surface. A more extensive system could involve both rotating brushes and jets of air.

It should be emphasized that all of the sliders 44, all of the power transmission gears 90 and all of the internal rollers 70 and end rollers 60 and take-up mechanisms at each end, comprise internal moving mechanical parts that are entirely contained within the closed inside region 36 bounded by the moving toroidal surface 42. Consequently, this region can never become contaminated with dust or foreign particles coming from the outside environment no matter how dusty the outside environment may become. Therefore, all of these internal mechanisms can be permanently lubricated with lubricating oils that will remain essentially uncontaminated indefinitely. This will enable them to run smoothly and continuously with very little friction or mechanical wear. (The inner guide tubes 54, 56 as well as other internal parts such as rollers and gears, etc., can be constructed from high strength stainless steel to reduce the mechanical wear to a minimum.) Notice also that the motors 76, the main driving gears 78 and the passive rollers 64, 66 are also separated from the material being conveyed by the moving surface. (These components are located adjacent the return run of the moving conveyor surface.) These mechanical components are also separated from the outside environment by the outer tube cover 48. Consequently, these components will also have a dust free environment to operate in which will make it easier to maintain proper lubrication and reduce friction and mechanical wearing.

It should also be emphasized that the outer tube cover 48 and the motor housings 104 can easily be made water tight. Consequently, this tubular conveyor can even follow paths that lie under water or completely underground and covered with earth (or mud). Yet the material being conveyed inside the tube will remain dry and completely protected from the outside environment.

The speed at which this tubular conveyor can operate is much greater than conventional belt conveyors of the prior art. Unlike conventional belt conveyors, the material cannot blow off, fall off or be knocked off by anything, even while going around curves. It can carry material along any path and can climb vertically to reach any elevation. It should be pointed out that when the tube is vertical, the material coming up is supported by the material below it. The material cannot slip back down the tube because the material below it always prevents such slipping. Of course, it is assumed that there is always some nearly horizontal run before the vertical run which is also full of material. The friction between this material and the inside tube walls is sufficiently high to prevent this material from slipping under the weight of the material in the vertical run. (Rubber cleats can be attached to the moving surface to increase the friction.

The actual construction and manufacture of this tubular conveyor could proceed by standardizing the diameters. For example, the smallest tubular conveyor with the above embodiment could have an inside diameter of 1 cm while the largest could have an inside diameter of 100 cm. Since these conveyors can be extended indefinitely, they could be manufactured in straight and curved sections with various standardized lengths and curvatures. The central sections (that are not ends) can be manufactured with conveying surfaces that are open at each end so that they can be easily spliced to adjoining sections. Likewise, the inner guide tubes and the outer tube cover can be manufactured so as to make it relatively easy to add on new sections. It could be laid like a pipeline and, to some extent, operated like a pipeline Only in this pipeline, the material flowing inside it is solid rather than liquid. It is a revolutionary, and fundamentally new pipeline that represents a totally new dimension in the art of transporting solid material.

As pointed out above, the tubular conveyor, based on my moving toroidal conveying surface topology, can have many different embodiments. The above system represents only one such embodiment. The next embodiment, which I will now disclose, is one where the tubular conveyor is suspended above the ground essentially by its own moving surface. In this embodiment, the rigid inner guide tube and the outer tube cover are not needed. This "self-supporting aerial tubular conveyor" will be ideal for continuous long distance overland haulage of bulk materials. It will cost only a small fraction of conventional long distance belt conveyors of the prior art.

FIGS. 9 and 10 are longitudinal and transverse views of a tubular self-supporting aerial conveyor system illustrating a moving toroidal conveying surface 42 suspended above the ground 106 by a plurality of spaced apart vertical support poles 108. These supporting poles 108 can have separation distances ranging from 10 to 100 meters depending upon the linear weight of the loaded conveyor. The moving toroidal conveying surface 42 is suspended from the poles 108 by a plurality of circular support rings 110 with rollers 112 mounted around their entire circumferential periphery. An enlarged longitudinal cross-section of these support rings 110 is shown in FIG. 11. The rings 110 consist of two identical outer rings 114 and one inner ring 116 with a smaller diameter. The two outer rings 114 are mounted in parallel planes slightly separated from each other and held in place by a tubular band-like structure 118 that extends completely around the outside circumference of the outer moving conveyor surface 120 (i.e., the return run of the moving surface). The inner ring 116 is mounted between the outer rings 114 and just barely tangent to them with just enough space left for the outer portion 120 of the moving conveyor surface (the return run) to pass between. The inner ring 116, which is not physically attached to anything, is held in place by the two adjacent outer rings 114 which are themselves held in place by the band-like supporting structure 118. The rollers 112 that are connected to these rings enable the outer portion (return run) 120 of the moving conveyor surface to pass between these rings with essentially zero friction The inner portion 122 of the moving conveyor surface that is actually carrying the load 124 (i.e., the carrying run of the conveyor) moves inside the inner ring 116 and passes smoothly over the rollers 112 of that ring—thereby giving the conveyor the required support. The tension in the carrying 122 and return 120 runs of the moving conveyor surface are adjusted such that most of the tension is concentrated on the carrying run 122. This enables the return run 120 to flex around and between the adjacent rollers 112 of the inner and outer rings without difficulty. It also minimizes the contact friction between the carrying and return runs of the conveyor surface that are moving in opposite directions. An enlarged transverse cross-section of the inner 116 and outer 114 rings is shown in FIG. 12. The supporting rings 110 are suspended from the supporting poles 108 by a plurality of cables 126 that are attached to the band-like supporting structure 118

As shown in FIG. 13, the ends of this aerial tubular conveyor are supported by an inner ring 128 and an outer ring 130 with a slightly greater diameter. The inner ring 128 and the outer ring 130 are fitted with a plurality of inner and outer rollers 132, 134 that are mounted completely around each ring separately. These rollers are closely spaced to follow the circular transverse contour of the moving conveyor surface. FIG. 14 is a transverse cross-section of one end of the conveyor illustrating these circumferential rollers 132, 134. At the discharge end of the conveyor, these rollers 132, 134 are powered by a primary power source. The detailed design of this drive system is essentially identical to that described above and used for the previous embodiment of the tubular conveyor.

At the discharge end of the conveyor, the carrying run 122 briefly emerges from the interior of the conveyor, discharges the material and passes around the inner rollers 132, thereby reversing direction and expanding to a slightly greater diameter. The moving surface becomes the return run 120 and passes back along the conveyor forming an outer moving tubular surface that completely encloses the inner tubular surface 122 (the carrying run) that is moving in the opposite direction. When the return run 120 reaches the opposite end of the conveyor, it passes around another set of inner rollers 132, thereby reversing direction and contracting to a slightly smaller diameter. The moving surface then becomes the carrying run 122, receives material, and passes back along the conveyor forming an inner moving tubular surface 122 that is completely enclosed within the outer tubular surface 120 (the return run) that is moving in the opposite direction. The process is smooth running, silent, continuous and extremely efficient.

As shown in FIG. 13, the outer support ring 130, at each end of this tubular conveyor, is attached to a band-like structure 136 that passes around the outer portion 120 (return run) of the moving surface. A plurality of support cables 138 are attached to this structure 136 in order to keep the ends of the conveyor in some desirable orientation. These cables 138 are also fitted with springs 140 or some other take-up mechanism to give the suspended tubular conveyor the proper longitudinal tension.

For long distance conveyor tubes, many of the rollers 112 in the supporting rings 110 can be powered by a plurality of motors around the band-like supporting structures 118. The design of these intermediate drive systems are essentially identical to that described in the previous embodiment of the tubular conveyor.

In some situations, it may be desirable to provide the suspended aerial tubular conveyor system with a support system that enables the moving conveyor surface to follow a more gentle path while moving over the supporting rings 110. In referring to FIG. 9 it is apparent that the conveyor path, although very gentle between poles, is cusp-like at each pole that changes abruptly from an inclined path to a declined path. These sharp bends can be eliminated by employing several sets of supporting rings of the type shown in FIGS. 11 and 12 instead of only one set per pole. This is accomplished by mounting the outer rings 142 of these multiple sets on a single rigid tubular support structure 144 that extends completely around the outer portion 120 of the moving conveyor (return run) that follows a gentle arcing path as shown in FIG. 15. A smaller diameter inner support ring 146 is mounted between each pair of outer rings 142. As in the previous design, each inner and outer ring is fitted with a plurality of rollers 148, 150 that extend completely around these inner and outer rings respectively. Each inner ring 146 is held in place by the two outer rings 142 by virtue of their proximity and by their slightly greater diameter. As shown in FIG. 15, the return run 120 of the moving surface passes between the inner and outer rings 146, 142 while the carrying run 122 passes over the inner ring 146. The path is very gentle and can be easily negotiated with a loaded conveyor tube. This supporting system also distributes the weight of the loaded conveyor over many more supporting rollers and is therefore less likely to have a mechanical failure. These arcing support sections 144 can extend several meters on each side of the supporting poles 108. They are suspended from the poles 108 by a plurality of cables 152. FIG. 16 is another longitudinal cross-sectional view of this suspension system.

The moving toroidal surface is constructed with a resilient rubberlike material to enable it to flex around the various rollers without tearing. The surface can also be impregnated with a network of high strength reinforcing fibers. These reinforcing members can be constructed in the form of relatively thin bands that extend longitudinally around the entire surface to form endless reinforcement belts that are molded directly into the surface.

As in the previous embodiment, it should be emphasized that the moving toroidal conveyor surface constitutes a hermetically sealed closed region that is cut off from the outside environment. Consequently, all of the moving mechanical parts in this region such as the inner supporting rings and their corresponding rollers operate in a completely sealed, dust-free environment. Hence, all of these moving parts can be permanently lubricated with lubricating oils that will remain uncontaminated indefinitely. They will continue to run smoothly and continuously with very little friction or mechanical wear. In addition, the entire inside face of the moving toroidal surface can be permanently lubricated with special fluids to make them extremely slippery when they contact each other. Hence, this suspended tubular conveyor will be able to operate smoothly and continuously with very little friction.

It is interesting to compare this suspended tubular conveyor with conventional long distance belt conveyors of the prior art. The long distance belt conveyors often require many thousands of individual rollers strung out along the entire path. These rollers must be mounted on an elongated, table-like structure and continuously monitored. It requires continuous lubrication of many thousands of moving mechanical parts. Poorly operating rollers have to be continuously replaced. Thus, construction and maintanance costs are very high. The suspended tubular conveyor disclosed herein, however, requires no complicated structural frame to be laid out continuously along its path and has very few mechanical parts, and these few mechanical parts require almost no maintenance. Thus, the suspended tubular conveyor system will be less expensive to construct and less expensive to maintain and operate than conventional belt conveyors of the prior art. In addition, they will be extremely energy efficient.

It should also be pointed out that the conveying speeds of these enclosed tubular conveyors can be significantly higher than anything found in the prior art. Hence, the physical size of these conveyors can be relatively small yet they will be able to transport relatively large quantities of material during a given time interval.

As pointed out in the beginning of this specification, the tubular conveyor is based upon my moving toroidal conveying surface topology and can have many different embodiments. The first embodiment introduced above had a rigid structure that resembled a rigid pipeline. The next embodiment was completely flexible and resembled a flexible rope suspended over a series of poles. I will now introduce an embodiment that resembles a flexible hose. Transverse and longitudinal cross-sections of this embodiment are shown in FIGS. 17 and 18 respectively.

In this flexible hose embodiment, a single flexible guide tube 154 with a circular cross-section is mounted inside a moving toroidal conveying surface 42. This guide tube 154 has relatively thick walls 156 and is constructed from a flexible material such as a propylene-copolymer. A plurality of relatively thin parallel and shallow guide slots 158 are cut longitudinally around both sides of the guide tube 154 thereby forming small continuous slots. A plurality of relatively small sliders 160 are mounted along the inside surface 162 of the moving toroidal conveying surface 42 in parallel rows that ride snugly inside the guide slots 158. The slides 160 are constructed with slightly enlarged tips 164 that are designed to keep the sliders 160 inside the guide slots 158 as the conveyor surface 42 moves around the guide tube 154. As described in the previous embodiment, a plurality of rollers are mounted around the circumference of each end of the guide tube 154 thereby allowing the moving conveyor surface 42 to pass smoothly and continuously around each end of the guide tube 154 with very little friction.

The entire guide tube 154 and moving surface 42 is enclosed in a flexible outer tube cover 166 that can also be constructed from the same flexible material used in the construction of the guide tube 154. As in the first embodiment, the flexible outer tube cover 166 is held in place relative to the flexible inner guide tube 154 by a plurality of inner rollers 168 mounted on the inner guide tube 154 and corresponding outer rollers 170 that are mounted on the outer tube cover 166.

An intermittent drive system is provided by powering a few of the rollers. This drive system is essentially identical to the drive system designed for the first embodiment. Likewise, take-up systems can be provided at each end of the conveyor that are essentially identical to those of the first embodiment.

The moving toroidal conveyor surface 42 is constructed with a resilient rubber-like material in order to make it sufficiently flexible and elastic so that it can follow the walls of the guide tube when the tube is bent without kinking or stretching beyond its elastic limits.

This "flexible hose conveyor system" can change paths while the conveyor is operating. The minimum radius of curvature of the conveyor is essentially that set by the flexible inner guide tube and the flexible outer tube cover.

All of the embodiments of my tubular conveyor given above have circular transverse cross-sections. However, in principle, it could have any cross-section geometry. For example, it could have a polygonal cross-section with flat walls instead of curved walls. FIGS. 19, 20 and 21 illustrate three different rigid tubular conveyor systems with triangular, rectangular and hexagonal cross-sections respectively. Referring to the triangular, rectangular and hexagonal cross-sections shown in FIGS. 19, 20 and 21 respectively as polygonal, these embodiments have central guide tubes that comprise an inner polygonal guide tube 172 and a larger outer polygonal guide tube 174 that are held in a spaced apart, co-axial configuration, by a plurality of spacers 176 that are mounted between them. In each case, the entire guide tube and supporting structure is enclosed and hermetically sealed inside a flexible elongated toroidal surface 42 that moves continuously around the guide tube in the longitudinal direction. The inner portion 178 of the surface 42 moves adjacent the inner guide tube 172 while the outer portion 180 of the surface 42 moves adjacent the outer guide tube 174.

Each vertex of the inner and outer polygonal guide tubes is fitted with a relatively thin linear structure 182 containing a shallow guide slot 184. These guide slots 184 extend parallel to each other over the entire length of each guide tube. A plurality of relatively small sliders 186 are attached to and protrude a small distance from the inside face of the moving toroidal surface 42. These sliders 186 ride snugly inside the guide slots 184 such that as the flexible toroidal surface moves around the guide tubes in the longitudinal direction, the surface follows and clings to the rigid external walls of the guide tubes even when these guide tubes follow curving paths. The sliders 186 are constructed with slightly enlarged tips 188 to prevent them from falling out of, or being pulled out of their respective guide slots 184. Hence, there is no transverse rotation or any significant distortion of the moving surface 42 relative to the guide tubes due to curves or due to the presence of material 190 that is being carried inside the tubular conveyor.

As in the first embodiment of my invention, the moving toroidal surface 42 and inner guide tubes are enclosed in a rigid outer tube cover 192 which also has a polygonal cross-section. This outer tube cover 192 is held in place relative to the rigid guide tubes 172, 174 by sets of passive co-acting rollers essentially identical to the first embodiment. FIGS. 22, 23 and 24 are longitudinal cross-sections of these triangular, rectangular and hexagonal rigid tubular conveyors respectively. As shown in FIGS. 22, 23 and 24, each set of passive co-acting rollers is composed of two spaced apart outer rollers 194, 196 that are mounted on a support frame 198 that is connected to the outer tube cover 192, and one inner roller 200 that is mounted between the inner and outer guide tubes 172, 174 and connected to them via a supporting structure 202. The outer portion (return run) 180 of the moving surface passes between the two outer rollers 194, 196 and the inner roller 200. As in the previous embodiment, the inner roller 200 is mounted such that it is almost tangent to the two outer rollers 194, 196 with just enough space left for the moving outer portion (return run) 180 of the moving surface to pass between. Consequently, the outer tube cover 192 is prevented from moving both laterally and longitudinally relative to the inner guide tubes 172, 174 because of the position occupied by the inner roller 200 relative to the outer rollers 194, 196. Notice that with these polygonal cross-section geometries, it is impossible for the rigid outer tube cover to rotate about the rigid inner guide tubes.

The end rollers 201 of these triangular, rectangular and hexagonal tubular conveyors are shown in FIGS. 25, 26 and 27 respectively, which are transverse cross-sections taken through the ends of these conveyors. These end rollers are similar to the inner rollers 200 mounted between the inner and outer guide tubes 172, 174. Other mechanical systems such as the take-up systems and intermittent drive systems are essentially identical with those described in the first embodiment and will not be repeated here. (But many variations and modifications of these systems are also possible.)

Although the suspended aerial tubular conveyor system described above was supported by a plurality of rollers mounted around a circular supporting frame (supporting ring) it could also be supported with rollers mounted on a polygonal supporting frame. Perhaps the ideal supporting frame for these aerial conveyors is triangular since this would require the least amount of rollers. This triangular cross-section may also be the most efficient design for rigid tubular conveyors with rigid outer covers.

Another important embodiment of my tubular conveyor is one that has a rigid inner guide tube but no protective outer tube cover to enclose the return run of the moving surface. As illustrated in FIG. 28, this embodiment is supported by a plurality of relatively small support structures 204 that are spaced apart under the conveyor. These support structures 204 are attached to rigid supporting bands 206 that extend completely around and enclose a small portion of the moving return run 208 of the conveyor. Each band structure 206 is held fixed relative to the inner guide tube 210 by a plurality of inner rollers 212, that are attached to the inner guide tube 210, and a plurality of outer rollers 214 that are attached to the rigid band-like structure 206. Portions of the moving return run pass between these inner and outer rollers. The design and operation of this holding mechanism is essentially identical to that used for holding the rigid outer tube cover fixed relative to the inner guide tube designed for the first embodiment of my tubular conveyor which is illustrated in FIGS. 4 and 6.

Other mechanical systems such as end rollers, take-up systems and intermittent drive systems are essentially identical with those disclosed in the first embodiment.

These tubular conveyors would be useful when the moving return run of the conveyor does not have to be protected and isolated from the outside environment. This embodiment could also have polygonal or other types of cross-section geometries.

Other embodiments of my continuous tubular conveyor can be designed by combining various embodiments disclosed above. For example, in designing a single continuous tubular conveyor system to remove coal out of a deep underground coal mine and transporting it several kilometers along the surface to a central location, the initial portion may lie along a horizontal path deep underground which eventually curves into a vertical path up some vertical shaft inside the mine. This section of the conveyor may have the rigid guide tube design with the rigid protective outer tube cover as described in my first embodiment. After coming out of the mine, the conveyor may follow a curving path to some intermediate point located at some elevation above the surface of the ground. From this point, on to the discharge point, the conveyor may take the form of an aerial tubular conveyor that is suspended from a series of support poles as described above. The moving toroidal surface, however, extends continuously between the initial and terminal ends of the conveyor.

Still another embodiment of my tubular conveyor involves using a roller bed for supporting the load. This embodiment is illustrated in the perspective cut-away view of FIG. 29. Although any convenient cross-sectional geometry can be used in this embodiment, the one illustrated in FIG. 29 is triangular. According to this embodiment, a rigid inner guide tube structure 216 with a triangular cross-section is mounted inside the flexible toroidal moving surface 42. A plurality of rollers 218 is mounted in a spaced apart configuration all along the bottom, sides and at each end of the guide tube structure 216. A rigid protective outer tube cover 220 is mounted around the moving surface 42 which encloses the coveyor and which also has a triangular cross-section. A second plurality of rollers 222 are mounted in a spaced apart configuration along the inside walls of the outer tube cover 220. The moving surface 42 moves around the inner guide tube structure 216 by passing over the rollers 218. The return run 224 of the moving surface 42 moves between these inner rollers 218 and the outer rollers 222 that are attached to the outer tube cover 220. The flexible moving surface 42 is made to follow the inner guide tube structure 216 by a plurality of sliders or rollers 226 that are attached to the inside vertices of the moving surface as described above for the embodiments with polygonal cross-sections. The outer tube cover 220 is held fixed relative to the rigid inner guide tube structure 216 by utilizing some of the inner rollers 218 and outer rollers 222 described above in a holding system essentially identical to that described in the first embodiment. Likewise, drive and take-up systems can be provided that are also essentially identical to those designed for the first embodiment. The carrying run 228 of this embodiment carries the load over the inner rollers 218 in a triangular tube that can follow straight or curving paths in any direction in three-dimensional space.

Although all of the above embodiments use moving toroidal conveying surfaces that are elastic in the transverse direction (so that they can flex around the end rollers where they expand or contract transversely to form the return or carrying runs respectively) this transverse elasticity is not always necessary. For example, consider a tubular conveyor with a rigid guide tube structure comprising an inner guide tube and an outer guide tube. It is possible to construct these guide tubes with different transverse cross-sections such that even though the outer guide tube always encloses the inner guide tube, the transverse perimeters of both tubes are identical. This possibility is illustrated in FIG. 30. In this embodiment, the inner guide tube 232 is rectangular on three sides with a zig-zag ceiling 234, while the outer guide tube 236 is rectangular on all four sides. Spacer elements 238 are mounted between these guide tubes that maintain their spaced apart configuration. The zig-zag ceiling 234 of the inner guide tube 232 enables the transverse perimeter of this tube to equal that of the outer guide tube 236 even though the outer guide tube encloses the inner guide tube. Consequently, when the carrying run 240 of the moving surface reaches the end of the conveyor, it can move around the ends of both tubes to become the return run 242 without having to undergo any transverse stretching whatsoever. Therefore, since the moving conveying surface of tubular conveyors that follow straight paths do not have to have any longitudinal elasticity, it is possible to construct embodiments of my invention that have moving surfaces that are completely inelastic. These cases, however, represent special situations. Most embodiments will require moving surfaces that are elastic in both transverse and longitudinal directions. Some embodiments will require moving surfaces that are more elastic along the transverse direction than along the longitudinal direction (or vice-versa). (The construction of surfaces with a desired anisotropic elasticity is well known in the art and will not be discussed here.) It should be emphasized however, that the moving surface of all possible embodiments of my invention has a toroidal topology regardless of its elastic properties. This toroidal topology is the underlying principle of my invention.

The development of high speed continuous passenger conveyors, (i.e., moving sidewalks) has remained essentially unchanged for nearly a century. Basically, all prior art continuous passenger conveyors are simple endless belt conveyors. For safety considerations, these belt conveyors are restricted from moving passengers faster than approximately one meter per second (2.24 mph). This situation is inherent in all prior art continuous passenger conveyors because there is no practical way of isolating the moving passengers from the stationary environment (i.e., from surrounding objects that are not moving which could come into direct contact with the moving passengers). There is no priot art conveyor system that can provide a practical solution to this fundamental problem—a problem which is considered in the prior art to be unsolvable. However, the tubular conveyor system disclosed herein, based on my moving toroidal conveying surface, does provide a practical solution to this passenger conveyor problem. In particular, the rigid tubular conveyor with the rectangular cross-section introduced above and illustrated in FIGS. 20, 23 and 26 would make an ideal high speed passenger conveyor. With this conveyor, the passengers would be transported in a moving passageway that would completely enclose them and the air inside it, thereby isolating and protecting them from all stationary objects outside the conveyor. By designing relatively simple methods for accelerating and decelerating the walls of this conveyor, the air inside it can be made to remain at rest relative to these walls. The walls and the air inside this tubular passenger conveyor remain at rest relative to the passengers inside it. Consequently, passengers could be transported through this conveyor essentially without their detecting any translational movement whatsoever. This possibility represents a fundamental breakthrough in the art of passenger conveyors and opens the door to ultra high speed tubular passenger conveyors capable of operating at several hundred meters per second. Such conveyors would make possible intercity passenger conveyors where passengers would be continuously transported between cities at nearly supersonic speeds.

FIG. 31 is a cut-away perspective view of a rigid tubular conveyor system with a rectangular cross-section serving as a continuous high speed passenger conveyor. The moving bottom portion 244 of this passenger conveyor can be supported by a smooth and nearly frictionless slider bed surface 246 that is hermetically sealed inside the moving surface. Many of the components of this passenger conveyor are essentially identical to those described in FIGS. 20, 23 and 26 and are therefore identified in FIG. 31 with the same numbers.

In ultra high speed intercity tubular passenger conveyors, that may exceed 100 km in length for example, the moving bottom portion of the surface may be "magnetically floated" a few millimeters above a smooth bed that has been permanently magnetized. In this embodiment, shown in FIG. 32, the entire moving surface 248 is magnetized by impregnating it with ferrite composite particles such as barium ferrite (in powder form) during its fabrication. The result is a moving surface with the same elastic, high strength physical properties but entirely magnetized with a definite field orientation. For example, the inside face 250 of the moving surface may be north while the outside face 252 may be south. Consequently, if the field orientation of the magnetized supporting bed 254 and guide tube 256 is such that its north pole face is always adjacent the inside face of the magnetized moving surface, the magnetic fields of the moving conveyor surface and the stationary guide tube 256 will be repulsive. Hence, the moving surface 248 and the passengers on it will be floated above the supporting bed 254 by a completely frictionless, non-contacting magnetic suspension system. The region inside the moving surface can be partially evacuated in order to balance the repulsive magnetic forces acting on the ceiling and vertical walls of the moving surface by atmospheric pressure. This magnetic suspension system does not consume any energy and there is nothing to wear out. The moving surface could be driven by linear motors that are also non-contacting. Many other types of magnetic suspension and drive systems could be used for these ultra high speed, non-contacting passenger conveyors. For more details concerning magnetic suspension systems see my prior U.S. Pat. No. 4,148,260 itled "High Speed Transit System". It should also be pointed out that non-contacting magnetic suspension and drive systems could also be used in tubular conveyors that move bulk material instead of passengers.

It is beyond the scope of this specification to disclose the detailed design and operating features of the continuous high speed tubular passenger conveyor systems described above. Rather, my intention is to point out the fact that my basic invention has far-reaching implications that could revolutionize many previous ideas concerning the continuous transportation of bulk materials and people.

Aside from the unique toroidal topological characteristics of the moving conveying surface, it is believed that no detailed description is required to describe its construction. It is obvious that some embodiments of the tubular conveyor with many curved sections require a moving surface with more longitudinal elasticity than others with fewer curves. Likewise, a moving surface designed to convey relatively sharp lumps of coal will be different from one designed to convey a soft granular material such as wheat. However, the art of conveyor belt design and manufacture is sufficiently advanced to provide the required physical characteristics for any specific embodiaant or application. Although the magnetized moving surface described above for magnetic suspension systems may be new to the art of conveyor belts, it is not new in the art of magnetic materials.

Although I have illustrated and described several particular embodiments of my invention, it is to be understood that the drawings and the description are illustrative of the underlying principles of my continuous tubular conveyor and are not to be construed as limitations of it. As various other embodiments, changes, variations, and modifications can be made in the continuous tubular conveyor without departing from the spirit or scope of the invention, it is intended that all subject matter contained in the above description or shown in the accompanying drawings should be interpreted as illustrative and not in a limiting sense.

What is claimed is:

1. A method for conveying loads through a flexible conduit comprising the steps of:
   enclosing the inside and outside walls of said flexible
      conduit within a flexible elongated toroidal conveying medium having a duct-like carrying run adjacent the inside walls of said conduit and a duct-like return run adjacent the outside walls of said conduit, said flexible toroidal conveying surface having elastic properties in both transverse and longitudinal directions;

attaching portions of the inside surface of said toroidal conveying medium to said flexible conduit such that said conveying medium moves substantially adjacent the inside and outside walls of said flexible conduit while said conduit is flexed to follow various paths;

enclosing the return run of said flexible toroidal conveying medium within a flexible outer conduit such that the separation distance between the flexible inner and outer conduits is substantially unchanged as the conduits are flexed along various paths; and moving said toroidal conveying medium such that said carrying run forms an endless moving duct that can be moved to follow different paths by flexing said flexible outer conduit while conveying said loads, 2. A method as set forth in claim 1 further comprising the step of enclosing at least a portion of the moving return run of said toroidal conveying surface inside a protective, duct-like outer cover.

3. A method as set forth in claim 1 further comprising the step of mounting a plurality of idler rollers on a duct-like structure between said carrying run and said return run of said moving toroidal conveying surface such that a portion of said carrying run moves over one side of said idler rollers while a portion of said return run moves over the other side of said idler rollers in the opposite direction, 4. A method for conveying loads as set forth in claim 1 further comprising the step of mounting take-up means on at least one end of said guide structure for maintaining proper longitudinal tension along said toroidal conveying medium.

5. A method as set forth in claim 1 further comprising the step of mounting a plurality of end rollers around the circumferential periphery of each end of said guide structure thereby allowing said flexible toroidal conveying medium to move smoothly around each end of said guide structure by passing over said rollers.

6. A conveyor system adapted for moving loads comprising:

an endless flexible elongated toroidal conveying medium with a moving inner duct and a moving outer duct that is substantially parallel to said inner duct and moves in the opposite direction wherein said inner duct comprises the carrying run of said conveying medium and wherein said outer duct comprises the return run of said conveying medium;

said flexible toroidal conveying medium having elastic properties in both transverse and longitudinal directions;

said conveying medium comprising a toroidal surface that determines a closed annular duct-like region inside said surface bounded by said carrying run and by said return run a flexible duct-like guide structure mounted inside said closed duct-like region;

a plurality of flexible guide tracks mounted along said flexible duct-like guide structure;

means for attaching portions of the inside surface of said conveying medium to said flexible guide tracks such that said conveying surface moves substantially adjacent said guide structure while said guide structure is flexed to follow different paths; and means for moving said toroidal conveying medium around said flexible guide structure.

7. A conveyor system as set forth in claim 6 further comprising:

a flexible protective outer cover conduit; and means for mounting said flexible outer cover conduit around said moving return run of said conveying medium such that the separation distance beteen said flexible guide structure and said flexible outer cover conduit is substantially constant while said outer cover conduit is flexed to follow various paths such that said system can be operated as a flexible hose conveyor.

8. A conveyor as set forth in claim 6 wherein said means for attaching portions of the inside surface of said toroidal conveying medium to said guide tracks comprises a plurality of T-shaned elements mounted longitudinally along the inside surface of said conveying medium that slide in locking engagement within said guide tracks.

9. A conveyor system as set forth in claim 6 further comprising a duct-like protective outer cover mounted around a portion of said moving return run of said toroidal conveying medium.

10. A conveyor system as set forth in claim 6 further comprising a plurality of idler rollers mounted on said duct-like guide structure between said carrying run and said return run of said moving toroidal conveying surface such that a portion of said carrying run moves over one side of said idler rollers while a portion of said return moves over the other side of said idler rollers in the opposite direction.

11. A conveyor system as set forth in claim 6 further comprising a plurality of end rollers mounted around the circumferential periphery of each end of said guide structure thereby allowing said flexible toroidal conveying medium to move smoothly around each end of said guide structure by passing over said rollers.

12. A conveyor system as set forth in claim 6 further comprising take-up means mounted on at least one end of said guide structure for maintaining proper longitudinal tension along said toroidal conveying medium.

13. A conveyor system as set forth in claim 6 further comprising a plurality of end rollers mounted around the circumferential periphery of each end of said guide structure thereby allowing said flexible toroidal conveying medium to move smoothly around each end of said guide structure by passing over said rollers.

14. A conveyor system as set forth in claim 6 further comprising take-up means mounted on at least one end of said guide structure for maintaining proper longitudinal tension along said toroidal conveying medium.

* * * * *